United States Patent [19]

Makise et al.

[11] Patent Number: 5,157,561
[45] Date of Patent: Oct. 20, 1992

[54] DIGITAL SIGNAL REPRODUCING APPARATUS

[75] Inventors: Tetsuro Makise; Kazuhiro Takano; Masaaki Isozaki, all of Kanagawa, Japan

[73] Assignee: Sony Corporation, Tokyo, Japan

[21] Appl. No.: 584,035

[22] Filed: Sep. 18, 1990

[30] Foreign Application Priority Data

Sep. 22, 1989 [JP] Japan ............... 1-247702

[51] Int. Cl.$^5$ ............... G11B 5/52; G11B 5/09
[52] U.S. Cl. ............... 360/70; 360/8; 360/51; 360/73.08
[58] Field of Search ............ 360/70, 51, 8–10.3, 360/73.05–73.08

[56] References Cited

U.S. PATENT DOCUMENTS 4,764,824  8/1988  Tani et al. ............... 360/70
5,045,954  9/1991  Oishi et al. ............... 360/8

Primary Examiner—Jerry Smith
Assistant Examiner—Steven R. Garland
Attorney, Agent, or Firm—Alvin Sinderbrand; William S. Frommer

[57] ABSTRACT

In a digital signal reproducing apparatus having a head on a rotating drum for reproducing a digital signal which includes information data and which was recorded on a magnetic tape running at a speed different from the tape speed during reproducing of the digital signal therefrom; the tape speed and the drum rotation speed are detected during reproducing and corresponding tape speed and drum speed signals, resectively, are generated, a clock signal is formed from the digital signal reproduced by the head and is used in decoding the information data from the reproduced digital signal, and a control device receives the tape speed and drum-speed signals for controlling the drum speed in accordance with the tape speed when the tape speed is at least as large as a first value and for maintaining a fixed drum speed while changing the clock signal in accordance with the tape speed when the tape speed is at least as large as a second value greater than the first value.

3 Claims, 5 Drawing Sheets

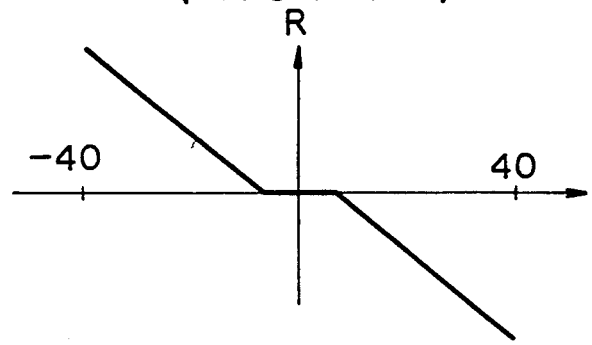
Fig. 3A
(PRIOR ART)
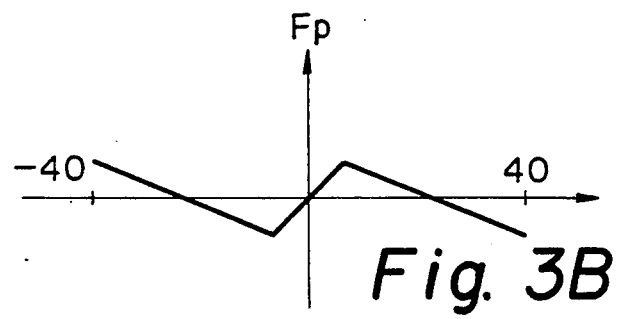
Fig. 3B
(PRIOR ART)
Fig. 4
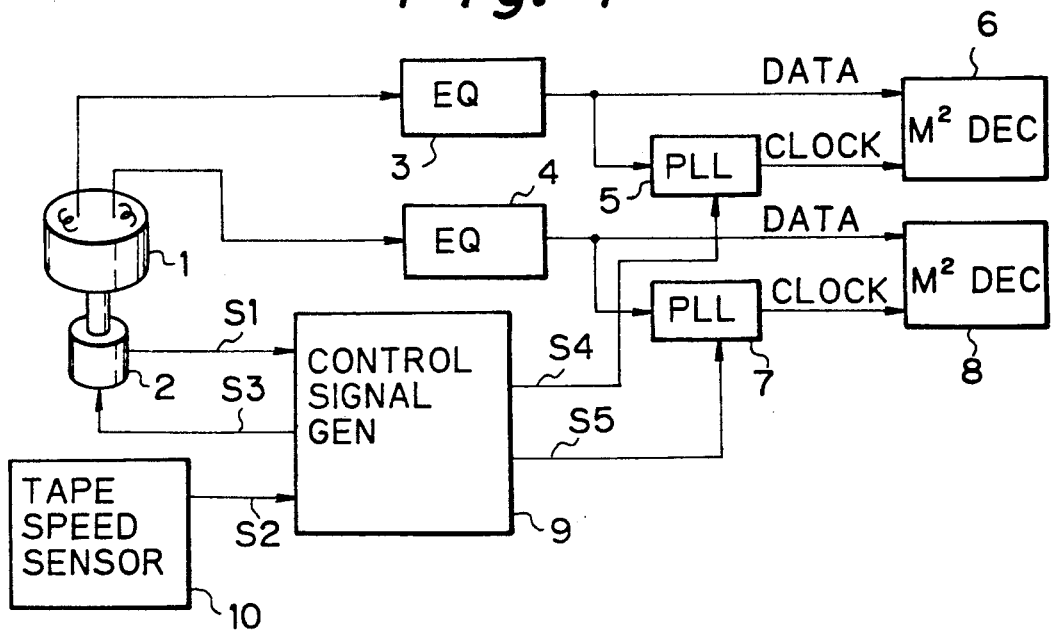

REPRODUCED DATA

EDGE PULSE

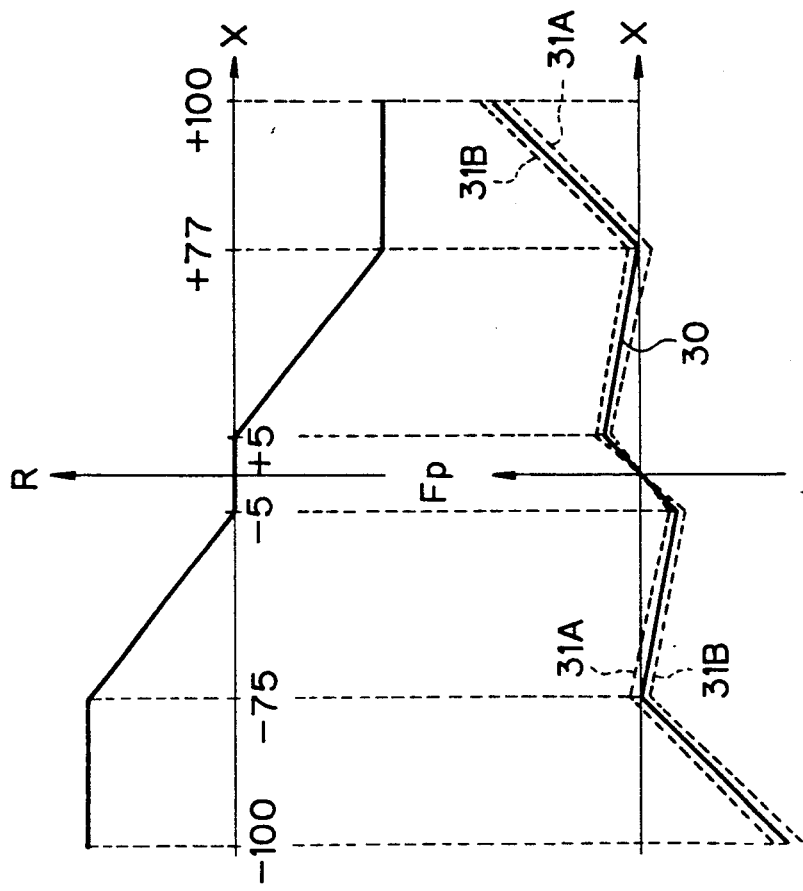

DIGITAL SIGNAL REPRODUCING APPARATUS

BACKGROUND OF THE INVENTION

Field of the Invention

This invention relates to a digital signal reproducing apparatus which is applied to a digital VTR.

Description of the Prior Art

There has been known a digital VTR which is configured to convert a composite color video signal into a digital signal and to record or reproduce it by means of a rotary head. In order to process a reproduced signal, a clock signal synchronized with the reproduced signal is reproduced by a PLL (phase locked loop). In FIG. 1 showing a conventional arrangement, reference numeral 41 refers to an input terminal of the reproduced signal, numeral 42 denotes the PLL within the broken line, and numeral 43 designates a decoding circuit of an M square code. The PLL 42 is composed of a phase comparator circuit 44 and a VCO (voltage controlled oscillator) 45. The phase comparator circuit 44 compares the reproduced signal with an output signal of the VCO 45 and supplies its comparison output to the VCO 45 as a control signal. The PLL 42 limits the lock range to a narrow range in order to prevent a pseudo lock. An output signal (clock signal) of the PLL 42 and the reproduced signal are fed to the decoding circuit 43, and decoding of the M square code is performed. The M square code is advantageous in that convergence of the spectrum of coded data is good and further in that no DC component is included as shown in FIG. 2. The PLL 42 is designed to have a narrow lock range 46 about the center frequency FO of the spectrum. Decoding of the M square code requires a clock signal having a frequency twice the data rate.

The digital VTR is operative not only in a normal playback mode, in which the tape speed is the same as that at the time of recording, but also in a variable speed playback mode, in which the tape speed is ± several times to ± decade times the speed in the normal playback mode (± means the tape running direction). Regarding the variable speed playback mode, an operation in which the tape speed is set in a range of (−1 to +3) times is referred to as "variable", an operation in which the tape speed corresponds to the rotation speed of a jog dial is referred to as "jog", and an operation in which the tape speed is continuously variable in a range faster than the variable operation is referred to as "shuttle". The variable speed playback is used for the purpose of locating in a short time a desired one of the video signals recorded on a tape.

In order to prevent large changes in the data rate (frequency) of the reproduced signal during the variable speed playback, the conventional apparatus varies the rotation speed of a head drum depending on the tape speed X. As shown in FIG. 3A, the rotation speed R of the drum is controlled, so that changes in the frequency Fp (FIG. 3B) of the reproduced signal are limited to small values even when the tape speed of the variable speed playback is the maximum value ±40. In FIG. 3A, the range, in which the rotation speed R of the drum is constant, corresponds to the variable range of the tape speed X during the variable operation and the jog operation.

The method of varying the rotation speed of the drum to prevent large changes in frequency of the reproduced signal has a drawback in that the drum rotating mechanism makes it difficult to extend the range of the variable speed playback. For example, in the case of variable speed playback at a tape speed of ±100 times normal speed, it is difficult to prevent large changes in frequency of the reproduced signal by mere control of the rotation speed of the drum.

OBJECTS AND SUMMARY OF THE INVENTION

It is, therefore, an object of the invention to provide a digital signal reproducing apparatus capable of extending the range of the variable speed playback. According to an aspect of the present invention, there is provided a digital signal reproducing apparatus having a head on a rotating drum for reproducing a digital signal which includes information data and is recorded on a magnetic tape while the tape is running at a speed different from the tape speed at the time of reproducing of the digital signal thereon comprising:

means for detecting a running speed of the magnetic tape during a reproducing operation and for generating a tape speed signal;

drum speed detecting means for detecting a rotation speed of the rotary drum during the reproducing operation and for generating a drum speed signal;

driving means for rotating the drum;

means for generating a clock signal from the digital signal which is reproduced by the head;

decoding means supplied with the reproduced digital signal and the clock signal for decoding the information data from the reproduced digital signal; and control means supplied with the tape speed signal and the drum speed signal for supplying a rotation speed control signal to the driving means so as to change the rotation speed of the rotary drum in response to the speed of the magnetic tape when the speed of the magnetic tape is at least as large as a first value, and for supplying a clock control signal to the means for generating a clock signal so as to change the clock signal in response to the speed of the magnetic tape while maintaining the rotation speed of the rotary drum at a fixed value when the speed of the magnetic tape is at least as large as a second value.

According to another aspect of the present invention, there is provided a digital signal reproducing apparatus having a pair of heads on a rotating drum, which heads have different azimuths, for reproducing a digital signal which includes information data and is recorded on a magnetic tape while the tape is running at a speed different from the tape speed at the time of the reproducing of the digital signal thereon, comprising:

means for detecting a running speed of the magnetic tape during a reproducing operation and for generating a tape speed signal;

means for detecting a rotation speed of the rotary drum during the reproducing operation and for generating a drum speed signal;

driving means for rotating the drum;

means for generating first and second clock signals from first and second digital signals which are respectively reproduced by the heads having different azimuths;

first and second decoding means supplied with the first and second reproduced digital signals and the first and second clock signals respectively for decoding the information data from the pair of reproduced digital signals; and control means supplied with the tape speed signal and the drum speed signal for supplying a rotation speed control signal to the driving means so as to change the rotation speed of the rotary drum in response to the speed of the magnetic tape when the speed of the magnetic tape is at least as large as a first value, and for supplying first and second clock control signals to the means for generating first and second clock signals so as to change the first and second clock signals in response to the speed of the magnetic tape while maintaining the rotation speed of the rotary drum at a fixed value when the speed of the magnetic tape is at least as large as a second value.

The above, and other, objects, features and advantages of the present invention will become readily apparent from the following detailed description thereof which is to be read in connection with the accompanying drawings.

BRIEF DESCRIPTION OF THE DRAWINGS

FIGS. 2, 3A and 3B are waveform diagrams for use in explanation of the conventional arrangement;

FIG. 4 is a block diagram of an embodiment of the present invention;

FIGS. 7A and 7B are waveform diagrams showing control operations of the embodiment of the invention.

DETAILED DESCRIPTION OF THE PREFERRED EMBODIMENTS

Figure 1:
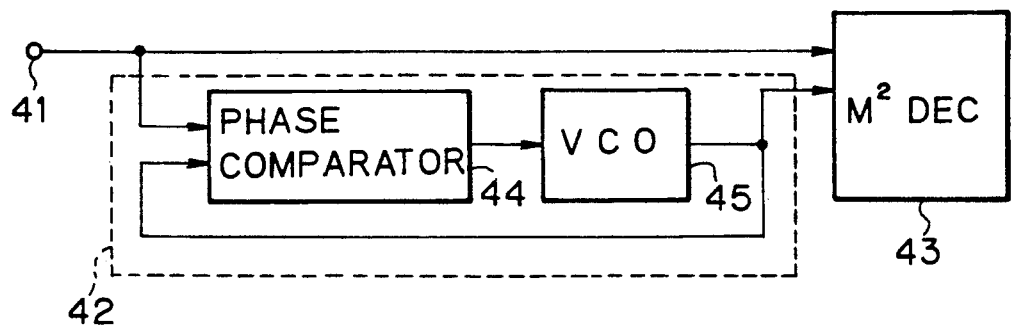
FIG. 1 is a block diagram of a conventional arrangement.
Figure 2:
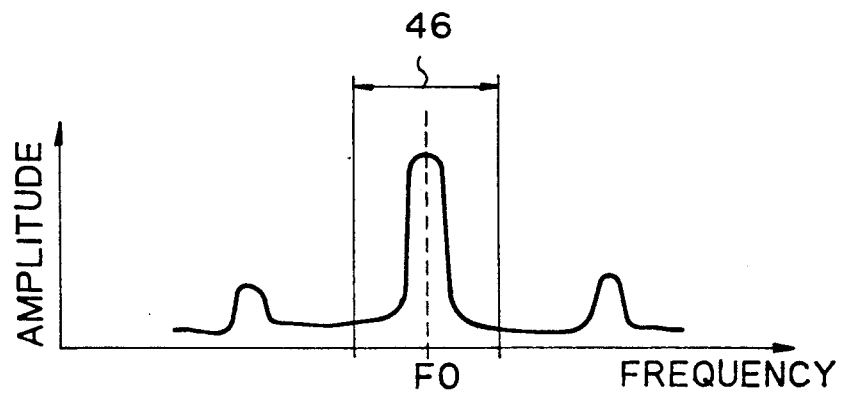

An embodiment of the invention is explained below with reference to FIG. 4 in which numeral 1 designates a head drum, and numeral 2 denotes a drum motor portion for rotating the head drum 1. The drum motor portion 2 includes a drum motor and a servo circuit for rotating the drum motor at a proper speed and in a proper phase.

The head drum 1 includes four head chips although not shown. First and second head chips are disposed adjacently, and third and fourth head chips are disposed adjacently. The first and third head chips are opposed at 180° intervals, and the second and fourth head chips are disposed similarly. Since a digital color video signal contains a large amount of information, one field thereof is divided into, for example, 3 segments with each segment recorded in two parallel tracks by the first and second head chips or by the third and fourth head chips. In order to increase the recording density, the embodiment employs a slant azimuth recording, i.e., a recording method in which gaps of head chips forming adjacent tracks extend in different directions from each other.

Among output signals of the head chips attached to the head drum 1, output signals of head chips of one azimuth (called a "+ azimuth"), i.e., output signals of the first and third head chips, are fed to an equalizing circuit 3 whereas output signals of head chips of the other azimuth (called a − azimuth) are fed to an equalizing circuit 4. An output signal of the equalizing circuit 3 is applied to a PLL 5 and a decoding circuit 6 for decoding an M square code. An output signal of the equalizing circuit 4 is supplied to a PLL 7 and a decoding circuit 8. The PLL's 5 and 7 produce clock signals which are synchronous with the reproduced signal. The decoding circuits 6 and 8 are supplied with the clock signals, respectively, and carry out decoding of the M square code.

A control signal generating circuit shown at 9 is provided, and it is supplied with a detection signal S1 indicative of the rotation speed of the drum from the drum motor portion 2. The circuit 9 is also supplied with a detection signal S2 in response to the tape speed from a tape speed sensor 10. The rotation speed of the drum can be detected by a magnetic rotation detector associated with the drum motor, and the detection signal S1 proportional to the rotation speed of the drum is formed. The tape speed sensor 10 may be, for example, a reel revolution detector which forms the detection signal S2 having a level proportional to the tape speed. The control signal generating circuit 9 provides the servo circuit of the drum motor portion 2 with a control signal S3 for controlling the rotation speed of the drum and control signals S4 and S5 for controlling reference frequencies of the PLL's 5 and 7.

Figure 5A:
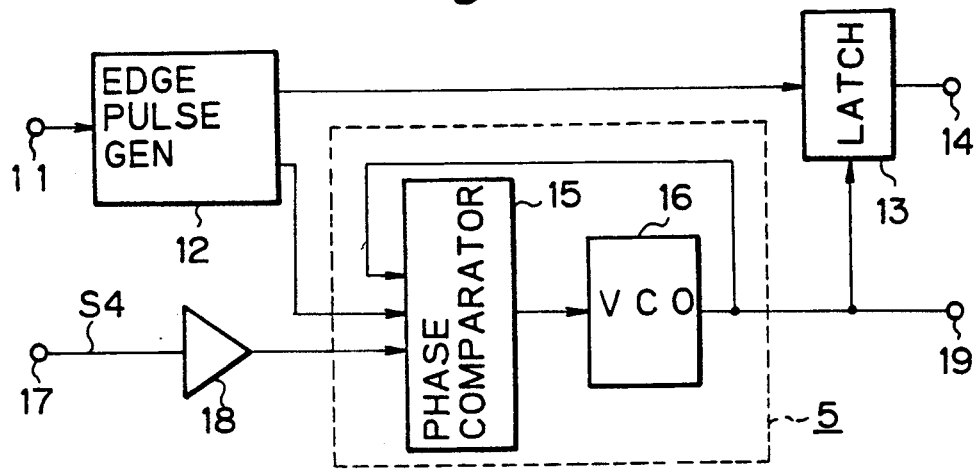
FIGS. 5A and 5B are block diagrams showing examples of PLLs employed in the embodiment of FIG. 4.
Figure 5B:
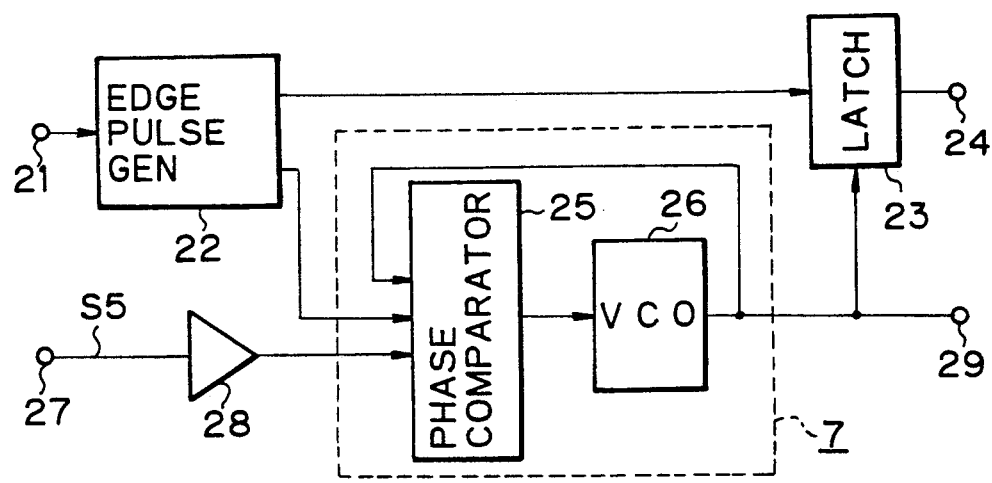
Figure 6A:
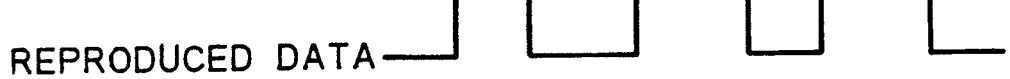
FIGS. 6A and 6B are waveform diagrams for explanation of the PLL.
Figure 6B:

FIGS. 5A and 5B show examples of arrangements of the PLL's 5 and 7 and their peripheral circuits. Reproduced data from the equalizing circuit 3 are fed through an input terminal shown at 11 to an edge pulse generating circuit 12. Referring to FIG. 6B, the edge pulse generating circuit 12 produces an edge pulse at the timing just after the rising and falling of the reproduced data (FIG. 6A). The edge pulse generating circuit 12 supplies the reproduced data to a latch 13 and supplies the edge pulse to a phase comparator circuit 15 of the PLL 5.

A VCO 16 supplies its output signal to the phase comparator circuit 15 which, in turn, supplies its output signal to the VCO 16 as a control signal. The phase comparator circuit 15 produces a phase comparison output having a level proportional to the phase difference between the edge pulse and the output signal of the VCO 16. The phase comparator circuit 15 includes a low pass filter acting on the comparison output. The VCO 16 produces a clock in phase with the edge pulse. The clock is fed to the latch 13, and it is also provided at an output terminal 19. The reproduced data are output from the latch 13 in synchronism with the clock, and the reproduced data are provided at an output terminal 14. The reproduced data and the clock are fed to the decoding circuit 6 as shown in FIG. 4.

The phase comparator circuit 15 of the PLL 5 is supplied with the control signal S4 from an input terminal 17 through an amplifier 18. A DC offset in response to the control signal S4 is added to the comparison output signal of the phase comparator circuit 15. Therefore, the reference frequency of the PLL 5 is controlled depending on the level of the control signal S4.

An output signal of the equalizing circuit 4 is fed to an input terminal 21 (FIG. 5B). As in the case of the output signal of the equalizing circuit 3 referred to above, there are provided the PLL 7 comprising a phase comparator circuit 25 and a VCO 26, a latch 23 for outputting the reproduced data in synchronism with a clock from the PLL 7 to an output terminal 24, and an amplifier 28 for amplifying the control signal from an input terminal 27.

FIGS. 7A and 7B shows control operations of this embodiment. The abscissas of FIGS. 7A and 7B indicate the relative tape speed X. As indicated in FIGS. 7A and 7B, the apparatus is configured so that variable speed playback is possible, for example, from −100 times to +100 times the normal tape speed. FIG. 7A shows a variation characteristic of the rotation speed R of the drum with respect to the tape speed X, and FIG. 7B shows a variation characteristic of the playback frequency Fp with respect to the tape speed X. In a recording system in which the color video signal of one field is divided into 3 segments (6 tracks) as referred to above, the rotation speed R of the drum is set to be three times the frame frequency, that is, 89.9 Hz, in the normal playback mode. The frequency Fp of the reproduced data in the normal playback mode is, for example, 128.3 MHz.

As illustrated by FIG. 7A, the rotation speed R of the head drum with a rotary head attached thereto is maintained at the same rotation speed as that at normal playback mode when the tape speed X approximates the speed in the normal playback mode, e.g., when it is in the range from −5 to +5, so that large changes in the frequency Fp of the reproduced data are prevented in this range.

In a range of the tape speed X beyond +5 until +77, the rotation speed R is reduced in accordance with the increase in the tape speed. Similarly, in a range of the tape speed X beyond −5 until −75, the rotation speed R is increased in accordance with the increase in the tape speed X. The relationship between the direction the tape is running and the rotating direction of the head drum (rotary head) determines whether the rotation speed R of the drum is to be increased or decreased with respect to the tape speed X. The control of the rotation speed R prevents large changes in the frequency Fp of the reproduced data. The frequency Fp of the reproduced data is equal to its value during normal playback mode at limit values of the rotation speed R of the drum as shown by a solid line 30 in FIG. 7B.

In ranges of the tape speed over +77 or −75 times the normal tape speed, the rotation speed R of the drum is fixed at a constant value. The limit value of the rotation speed R is restricted by a head drum rotating mechanism. For example, the rotation speed of (±32 Hz) may be the limit value with respect to the rotation speed R of the normal playback mode (=89.91 Hz).

When the rotation speed R of the drum is constant, the frequency Fp of the reproduced data varies with the tape speed, and, for example, it varies no more than approximately ±10% of the value in the case of the normal playback mode. The reference frequencies of the PLL's 5 and 7 are controlled by the control signals S4 and S5 so as to follow the variation in the frequency Fp, and the PLL's 5 and 7 are thereby locked to the reproduced data.

When the rotary head obliquely runs across a track during the variable speed playback mode, variation in the frequency Fp of the reproduced data differs depending on the azimuth angle. Such a difference caused by the azimuth angle gets large as the frequency Fp of the reproduced data increases. In FIG. 7B, a broken line 31A indicates such a frequency variation of the reproduced data from an a − (minus) azimuth track whereas a broken line 31B indicates a frequency variation of the reproduced data from an a + (plus) azimuth track. Therefore, the PLL's 5 and 7 are independently controlled by the control signals S4 and S5 from the control signal generating circuit 9. Since the control of the rotation speed R of the drum provides a certain limitation on the variation in the frequency Fp of the reproduced data, the PLL's 5 and 7 can produce clocks in phase with the reproduced data under the control of the reference frequencies of the PLL's 5 and 7 in response to the tape speed X.

The control signal generating circuit 9 is composed of a microcomputer, for example. The microcomputer generates the control signal S3 for controlling the rotation speed from the tape speed indicated by the detection signal S2. The control signal S3 is output in accordance with the characteristic shown in FIG. 7A. The reference frequencies of the PLL's 5 and 7 are varied depending on the relative speeds of the tape and the head. Therefore, the microcomputer of the control signal generating circuit 9 computes the relative speeds from a detection signal S1 which is proportional to the rotation speed R of the head drum and a detection signal S2 which is proportional to the tape speed. The control signals S4 and S5 are produced in accordance with the relationship between the rotation speed R of the head drum and the tape speed for the PLL's 5 and 7.

Figure 8:
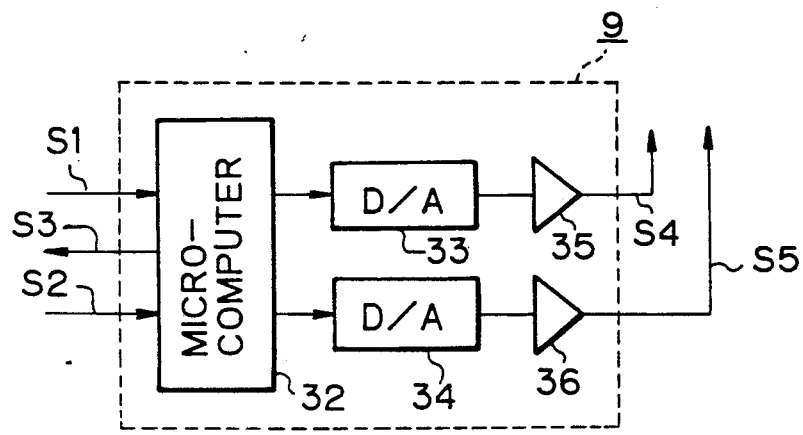
FIGS. 8 and 9 are block diagrams of control signal generating circuits according to embodiments of the present invention.

FIG. 8 shows an example of the control signal generating circuit 9. The microcomputer shown at 32 generates the control signal S3 for the drum motor portion 2 and the control signals S4 and S5 for the PLL's 5 and 7 as referred to above. Since the drum motor portion 2 is composed of a digital servo, the control signal S3 is a digital signal. Since analog signals are needed for the control signals S4 and S5 provided for the PLL's 5 and 7 as offset signals, the outputs of the microcomputer 32 corresponding to the signals S4 and S5 are supplied to D/A converters 33 and 34 and from the latter through amplifiers 35 and 36 to the PLL's 5 and 7.

Figure 9:
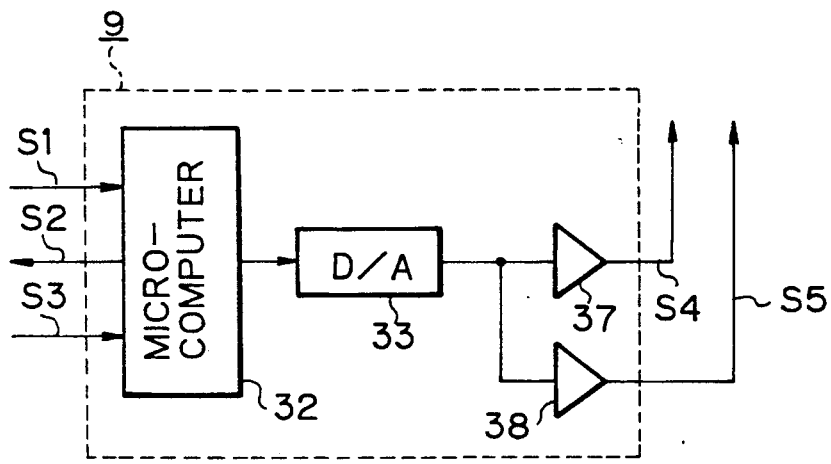

FIG. 9 shows another example of the control signal generating circuit 9. The microcomputer 9 generates a single digital control signal for providing the offset signal to control the reference frequencies of the PLL's. The control signal is provided to variable gain amplifiers 37 and 38. An output signal of the variable gain amplifier 37 is used as the control signal S4 for the PLL 5 provided in the + azimuth channel whereas an output signal of the variable gain amplifier 38 is used as the control signal S5 from the PLL 7 provided in the − azimuth channel.

The arrangement of FIG. 9 has the advantage that a single D/A converter suffices and the further advantage that the microcomputer 32 need not calculate individual control signals for channels having different azimuth angles.

The invention may also be used in program playback in which the tape speed is changed from the normal speed to adjust the playback period of time.

Additionally, the invention may also be used in a digital VTR using a channel coding other than the M square code.

What is claimed is:

1. A digital signal reproducing apparatus having a head on a rotary drum for reproducing a digital signal which includes information data and was recorded on a magnetic tape while the tape was running at a speed different from the tape speed at the time of reproducing of the digital signal thereon, comprising:

means for detecting a running speed of the magnetic tape during reproducing and for generating a corresponding tape speed signal;

means for detecting a rotation speed of the rotary drum during said reproducing and for generating a corresponding drum speed signal;

driving means for rotating said drum;

means for generating a clock signal from the digital signal which is reproduced by said head;

decoding means supplied with said reproduced digital signal and said clock signal for decoding said information data from said reproduced digital signal; and control means supplied with said tape speed signal and said drum speed signal for supplying a rotation speed control signal to said driving means so as to change the rotation speed of the rotary drum in response to the speed of the magnetic tape when the speed of the magnetic tape is at least as large as a first value, and for supplying a clock control signal to said means for generating a clock signal so as to change the clock signal in response to the speed of the magnetic tape while maintaining the rotation speed of the rotary drum at a fixed value when the speed of the magnetic tape is at least as large as a second value.

2. A digital signal reproducing apparatus according to claim 1, wherein said means for generating a clock signal includes a PLL circuit having voltage controlled oscillator means for producing said clock signal, and phase comparator means phase comparing said clock signal with said reproduced digital signal to produce a corresponding comparison output signal which controls said voltage controlled oscillator means, and said clock control signal is added to said comparison output signal to change the clock signal.

3. A digital signal reproducing apparatus having a pair of heads on a rotating drum, which heads have different azimuths, for reproducing a digital signal which includes information data and is recorded on a magnetic tap while the tape is running at a speed different from the tape speed at the time of reproducing of the digital signal thereon comprising:

means for detecting a running speed of the magnetic tape during reproducing and for generating a corresponding tape speed signal;

driving means for detecting a rotation speed of the rotary drum during reproducing and for generating a corresponding drum speed signal;

driving means for rotating the drum;

means for generating first and second clock signals from first and second digital signals which are respectively reproduced by said heads having different azimuths;

first and second decoding means supplied with said first and second reproduced digital signals and said first and second clock signals, respectively, for decoding the information data from said first and second reproduced digital signals; and control means supplied with the tape speed signal and the drum speed signal for supplying a rotation speed control signal to said driving means so as to change the rotation speed of the rotary drum in response to the speed of the magnetic tape when the speed of the magnetic tape is at least as large as a first value, and for supplying first and second clock control signals to said means for generating first and second clock signals so as to change said first and second clock signals in response to the speed of the magnetic tape while maintaining the rotation speed of the rotary drum at a fixed value when the speed of the magnetic tape is at least as large as a second value.

* * * * *